United States Patent
Rew et al.

(10) Patent No.: US 9,454,236 B2
(45) Date of Patent: Sep. 27, 2016

(54) THREE-DIMENSIONAL MOUSE DEVICE AND MARIONETTE CONTROL SYSTEM USING THE SAME

(71) Applicant: Hoseo University Academic Cooperation Foundation, Asan-si, Chungcheongnam-do (KR)

(72) Inventors: Keun Ho Rew, Cheonan-si (KR); Kyeong Min Cheon, Incheon (KR); Seok Bum Lee, Seongnam-si (KR); Hak Su Kim, Cheonan-si (KR); Dong Hyun Kim, Cheonan-si (KR)

(73) Assignee: Hoseo University Academic Cooperation Foundation, Asan-si, Chungcheongnam-do (KR)

( * ) Notice: Subject to any disclaimer, the term of this patent is extended or adjusted under 35 U.S.C. 154(b) by 0 days.

(21) Appl. No.: 14/600,594

(22) Filed: Jan. 20, 2015

(65) Prior Publication Data
US 2016/0202765 A1 Jul. 14, 2016

(30) Foreign Application Priority Data
Jan. 14, 2015 (KR) .................. 10-2015-0006642

(51) Int. Cl.
G06F 3/01 (2006.01)
G06F 3/0354 (2013.01)
A63J 19/00 (2006.01)

(52) U.S. Cl.
CPC ............ *G06F 3/017* (2013.01); *A63J 19/006* (2013.01); *G06F 3/014* (2013.01); *G06F 3/03543* (2013.01)

(58) Field of Classification Search
None
See application file for complete search history.

(56) References Cited

U.S. PATENT DOCUMENTS

| | | | |
|---|---|---|---|
| 2010/0227527 A1* | 9/2010 | Smoot .................. | A63F 7/0088 446/362 |
| 2011/0118870 A1* | 5/2011 | Sugihara ............... | A63H 11/20 700/245 |
| 2014/0371906 A1* | 12/2014 | Barajas ................ | B25J 9/1664 700/257 |

FOREIGN PATENT DOCUMENTS

KR 10-0920252 B1 10/2009

* cited by examiner

*Primary Examiner* — Joseph Haley
(74) *Attorney, Agent, or Firm* — Novick, Kim & Lee, PLLC; Jae Youn Kim

(57) ABSTRACT

Provided are a three-dimensional mouse device using several body parts, and a marionette control system using the same. The three-dimensional mouse device includes: a support member that is worn on at least one of a head, a face, an arm, and a foot among body parts; an action recognition module that is mounted on the support member; and an action recognition module that is attached to the support member to sense a motion of the body parts and output a sensing signal to the action recognition module.

5 Claims, 10 Drawing Sheets

THREE-DIMENSIONAL MOUSE DEVICE AND MARIONETTE CONTROL SYSTEM USING THE SAME

BACKGROUND

1. Field of Invention

The present invention relates to a three-dimensional mouse device, and more particularly, to a three-dimensional mouse device, which is capable of three-dimensionally control a mouse or an object by using several body parts, especially by a wrist gesture and a finger gesture, and a marionette control system using the same.

2. Description of the Related Art

A mouse device is one of input devices that are connected to a computer device. The mouse device can be used to perform various operations, such as an operation of selecting a specific position or item or moving an object or group on a computer screen. At present, a 3-button mouse, including a wheel, is widely used. However, it may be difficult to use a general mouse in a work environment where the use of two hands is difficult or when there is a physical handicap. In order to solve such problems, there has been proposed an apparatus for executing a mouse on the air by using a motion of a finger.

However, the mouse according to the related art is similar to an existing mouse that widely uses fingers and has a limitation to efficiently apply to a user with a physical handicap in the above-described various work environments or several types of physical handicaps. Accordingly, there is an increasing need for a mouse that can be randomly selected and used according to various work environments or various physical conditions (including a handicap).

CITATION LIST

Patent Literature (Patent Literature 1) KR10-0920252 B1

SUMMARY

An embodiment of the present invention provides a three-dimensional mouse device using several body parts (wrist, etc.).

In addition, another embodiment of the present invention provides a three-dimensional mouse device using a motion of a body part with respect to a head, eyes, wrist, ankle, or a combination thereof.

Furthermore, another embodiment of the present invention provides a three-dimensional mouse device using a wrist gesture and a finger gesture.

Moreover, another embodiment of the present invention provides a marionette control system capable of remotely controlling a marionette by using a technology applied to the above-described three-dimensional device.

According to an aspect of the present invention for achieving the above object, a three-dimensional mouse device includes: a support member that is worn on at least one of a head, a face, an arm, and a foot among body parts; an action recognition module that is mounted on the support member; and a sensing unit that is attached to the support member to sense a motion of the body parts and output a signal to the action recognition module.

According to another aspect of the present invention, a marionette control system includes a sensing unit, a conversion unit, and a communication unit. The marionette control system includes: a second controller that includes a sensing unit, a conversion unit, and a communication unit, the second conversion unit being installed on a wrist of a user to sense a preset gesture of the wrist; and a first controller that includes a sensing unit and a conversion unit, the first controller being installed in a finger of the user to sense a preset gesture of the finger, wherein the first controller provides the gesture input of the finger to the second controller, and the second controller transmits an action control signal corresponding to the gesture input of the finger and the gesture input of the wrist to a controller of the marionette through the communication unit.

In an embodiment, the first controller may include a plurality of controllers that are installed in a plurality of fingers of the user, respectively.

In an embodiment, a control relation between the fingers and the marionette in each gesture mode by the plurality of first controller and the second controller may omit a ring finger and a little finger and include a plurality of control modes that are divided into a control dedicated to an upper body, a control dedicated to a lower body, a control dedicated to a left side, a control dedicated to a right side, a crossing control, and a control for each finger.

In an embodiment, the first controller or the second controller may convert or set the gesture such that a body part of the marionette corresponding to a forefinger or a middle finger of any one selected among a plurality of control modes according to the gesture mode becomes other body part of the marionette corresponding to the forefinger or the middle finger of other control mode among the plurality of control modes (the setting corresponds to the gesture conversion).

In an embodiment, the gesture mode may include eight degree-of-freedom actions: four arm/foot gestures, a neck gesture, a plane movement gesture, and a jump gesture. The first controller or the second controller may perform gesture conversion so as to cope with deficient degree of freedom of the finger, including a twist, due to the interworking of the fingers when the finger gesture is generated.

DETAILED DESCRIPTION OF THE EMBODIMENTS

Hereinafter, exemplary embodiments of the present invention will be described in detail with reference to the accompanying drawings. The terms to be described below are defined in consideration of functions in the present invention and may be defined differently depending on a user or operator's intention or practice. Therefore, the definitions of such terms are based on the overall descriptions of the present specification.

Figure 1:
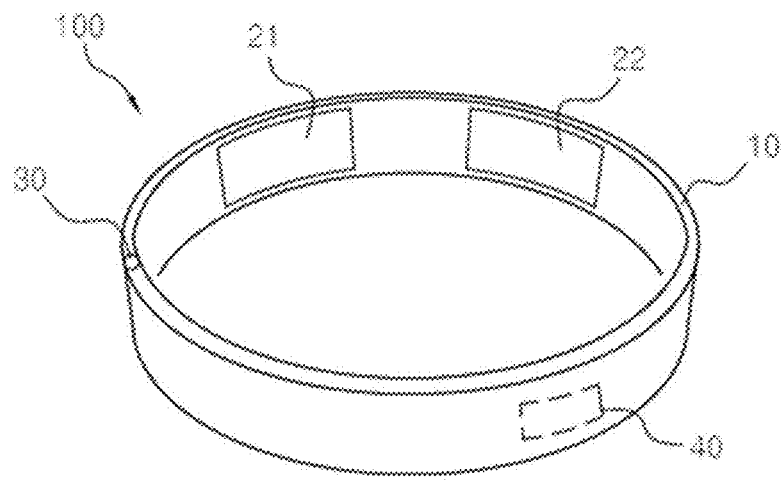
FIG. 1 is a perspective view of a three-dimensional mouse according an embodiment of the present invention.
Figure 2:
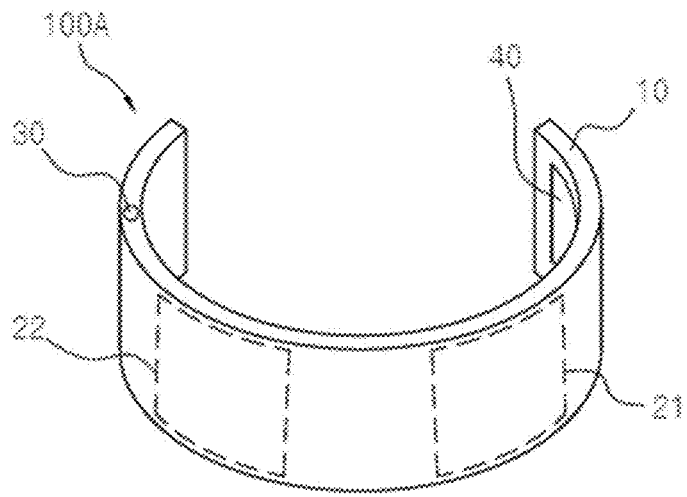
FIG. 2 is a perspective view illustrating a modification of the three-dimensional mouse of FIG. 1.
Figure 3:
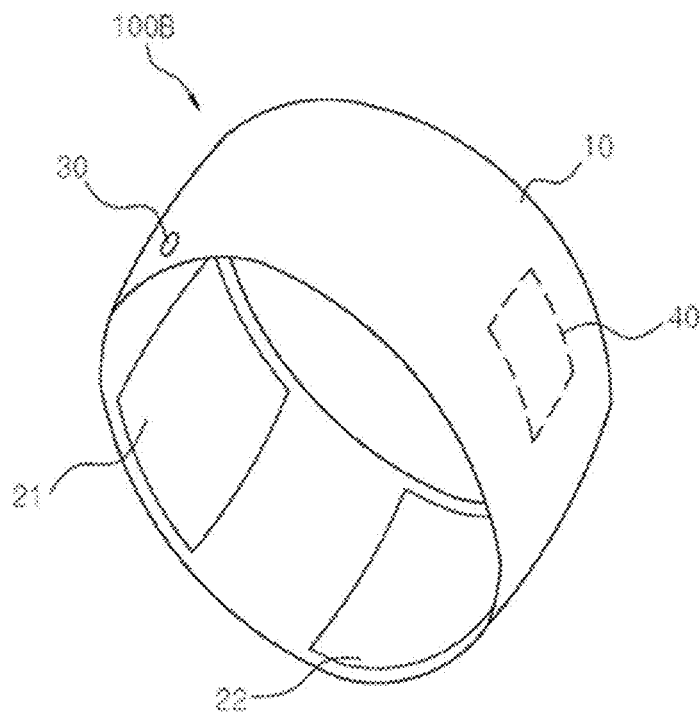
FIG. 3 is a perspective view illustrating a modification of the three-dimensional mouse of FIG. 1.

FIG. 1 is a perspective view of a three-dimensional mouse device according an embodiment of the present invention. FIG. 2 is a perspective view illustrating a modification of the three-dimensional mouse device of FIG. 1. FIG. 3 is a perspective view illustrating a modification of the three-dimensional mouse device of FIG. 1.

Referring to FIG. 1, the three-dimensional mouse device 100 according to the present embodiment includes a support member 10, touch pads 21 and 22, a microphone 30, and an action recognition module 40. The microphone 30 may be omitted in the three-dimensional mouse device 100 according to implementations.

The support member 10 has a ring-type headband shape. The support member 10 is made of a substantially inelastic or hard member. It is preferable that the perimeter length of the support member 10 is adjustable according to a head size of a user, but it is omitted in the present embodiment for convenience of illustration and description.

The touch pads 21 and 22 may also be referred to as a first touch pad 21 and a second touch pad 22. The touch pads 21 and 22 sense a muscle movement caused by a blink of a user's eyes in such a state that the support member 10 is worn on the user's head. For this purpose, the touch pads 21 and 22 are disposed on the inner surface of the band-type support member 10 and spaced apart by approximately a distance between two eyes of a human.

The microphone 30 is mounted on the support member 10 and is electrically connected to the action recognition module 40. The microphone 30 converts a user's voice into a signal and transfers the signal to the action recognition module 40.

The action recognition module 40 may be configured to control some functions of the mouse according to the signal from the touch pads 21 and 22 or the microphone 30 and control the remaining functions of the mouse based on a gyro sensor or an acceleration sensor embedded therein. The action recognition module 40 may include a 6-axis motion sensor.

Figure 4:
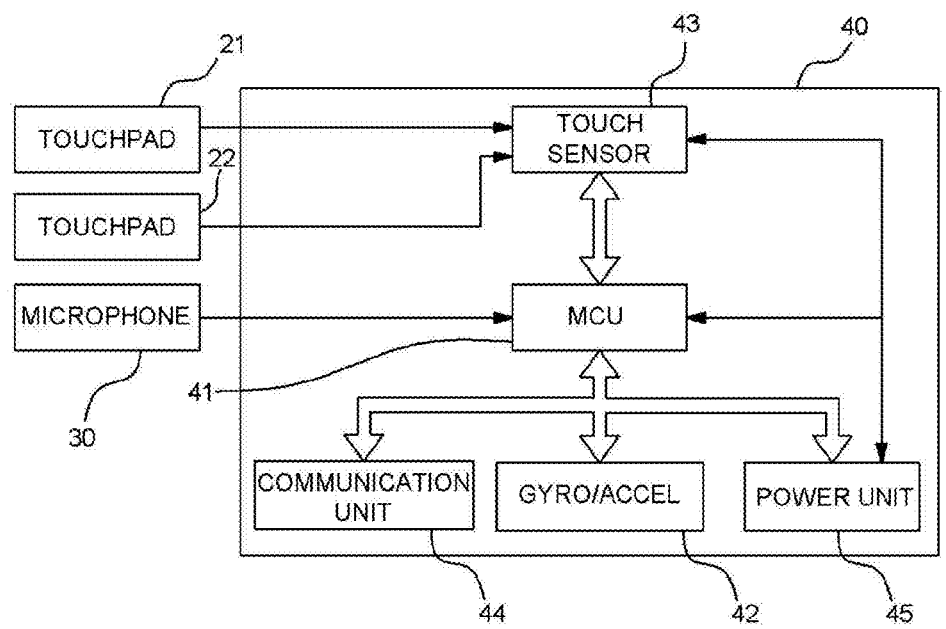
FIG. 4 is a block diagram of the three-dimensional mouse of any one of FIGS. 1 to 3.

FIG. 4 is a block diagram of a configuration that can be employed in the three-dimensional mouse device of any one of FIGS. 1 to 3.

Referring to FIG. 4, the three-dimensional mouse device according to the present embodiment includes a first touch pad 21, a second touch pad 22, a microphone 30, and an action recognition module 40. The action recognition module 40 includes a control unit 41 configured by a microcontroller unit (MCU), a gyro sensor or an acceleration sensor 42, a touch sensor 43, a communication unit 44 for wireless communication with an external computer device, and a power unit 45 that supplies power to elements. The first touch pad 21, the second touch pad 22, and the touch sensor 43 may constitute a sensing unit.

Since the unique functions of the respective elements have already been well known, a detailed description thereof will be omitted. However, in the present embodiment, a three-dimensional mouse device using body parts, except for fingers, is implemented by combining such elements. The operation principle of such a device will be described below.

Figure 5:
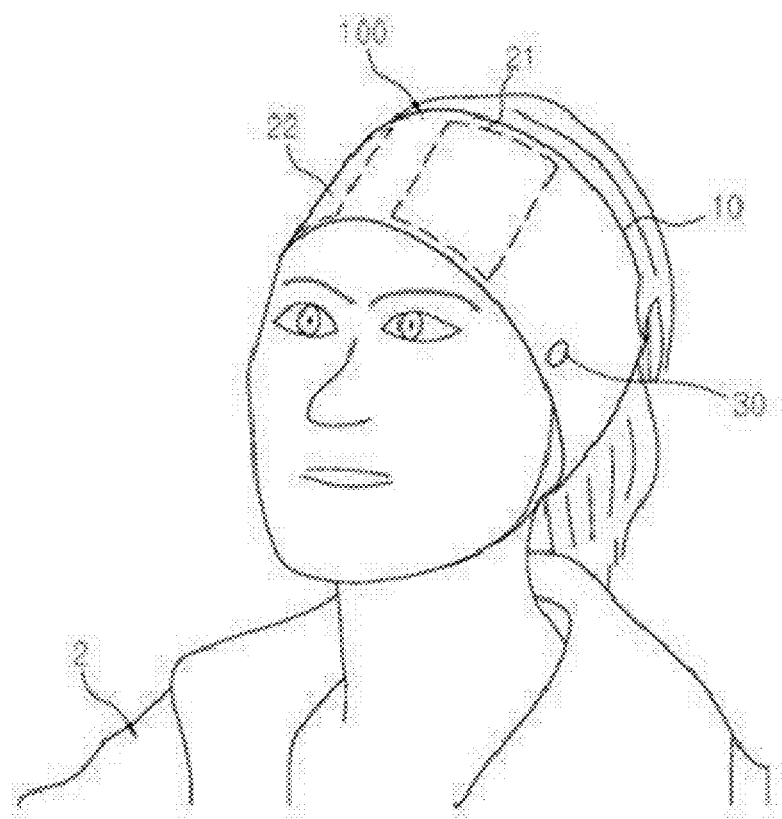
FIG. 5 is a diagram for describing an operation principle of the three-dimensional mouse of FIG. 3.

FIG. 5 is a diagram for describing the operation principle of the three-dimensional mouse device of FIG. 3.

Referring to FIG. 5, in the headband-type three-dimensional mouse device 100 according to the present embodiment, the action recognition module (see 40 of FIG. 3) may generate x-axis and y-axis cursor movements by sensing vertical and horizontal movements of a head of a user 2, based on a 3-axis gyro sensor or acceleration sensor embedded therein, may determine a wheel velocity according to an acceleration magnitude of the vertical movement of the head, may execute move-backward when the acceleration of the left movement of the head is greater than a preset acceleration, and may execute move-forward when the acceleration of the right movement of the head is greater than the preset acceleration.

In addition, the action recognition module may execute left-click when a muscle movement caused by a blink of a user's left eye is detected through the sensing unit, may execute a preset double-click (double-click of a left button or a right button) when a muscle movement caused by twice blink of a user's left eye within a preset unit time, and may execute right-click when a muscle movement caused by a blink of a user's right eye is sensed.

According to another implementation, the action recognition module may generate x-axis and y-axis cursor movements by sensing vertical and horizontal movements of a head of a user 2, based on a 3-axis gyro sensor or acceleration sensor embedded therein, may determine a wheel velocity according to an acceleration magnitude of the vertical movement of the head, may execute move-backward when the acceleration of the left movement of the head is greater than a preset acceleration, and may execute move-forward when the acceleration of the right movement of the head is greater than the preset acceleration.

The action recognition module may execute left-click, double-click, or right-click when a voice signal input to the microphone 30 is matched with a prestored left-click, double-click, or right-click command.

Figure 6:
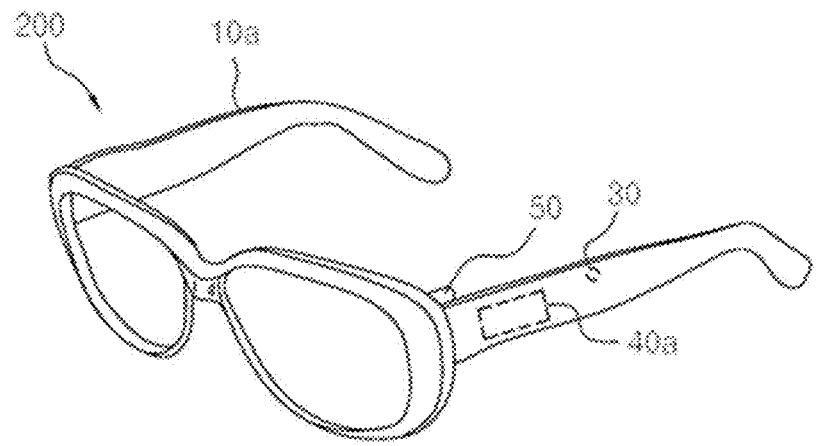
FIG. 6 is a perspective view of glasses employing a three-dimensional mouse according another embodiment of the present invention.
Figure 7:
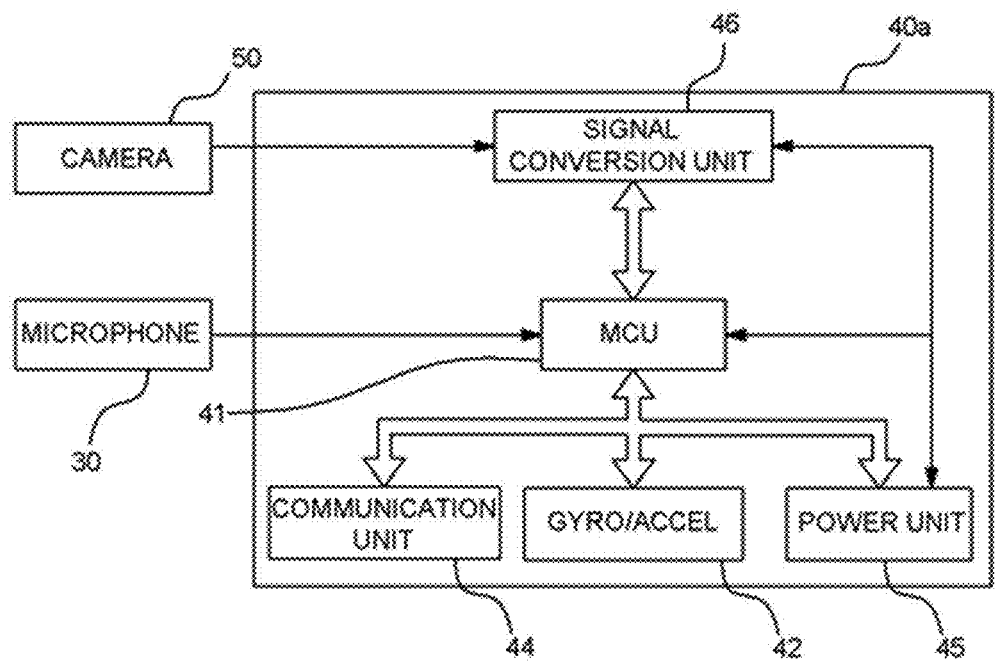
FIG. 7 is a block diagram of the three-dimensional mouse of FIG. 6.

FIG. 6 is a perspective view of glasses employing a three-dimensional mouse device according another embodiment of the present invention. FIG. 7 is a block diagram of the three-dimensional mouse device of FIG. 6.

Referring to FIG. 6, the three-dimensional mouse device 200 according to the present embodiment is mounted on the glasses 10a. The glasses 10a may function as a support member of the three-dimensional mouse device 200. The glasses 10a have a general glasses shape, but are not limited thereto. The glasses 10a may be modified to have a goggles shape. The three-dimensional mouse device 200 may include a microphone 30, an action recognition module 40a, and a camera 50.

The microphone 30 may be installed in one of temples of the glasses 10a. The microphone 30 receives a user's voice and transmits an output signal corresponding to the voice signal to the action recognition module 40a.

The camera 50 may be installed in one temple that is close to a lens of the glasses 10a. The camera 50 is a type of an image sensor and is mounted on a glasses-type or goggles-type support member. The camera 50 may sense a blink of a left eye and a right eye. The camera 50 may use an inexpensive product, the resolution of which is very low enough to sense only information on the blink of the user's eyes, but is not limited thereto. A sensing signal regarding the eye blink sensed by the camera 50 is output to the action recognition module 40a.

The action recognition module 40a may be inserted and installed in one of the temples of the glasses 10a. The action recognition module 40a may include a control unit 41 configured by an MCU, a gyro sensor or an acceleration sensor 42, a communication unit 44 for wireless communication with an external computer device, a power unit 45, and a signal conversion unit 46.

The signal conversion unit 46 may receive an image output signal of the camera 50, convert the image output signal into a predetermined input signal, and transfer the predetermined input signal to the control unit 41. The signal conversion unit 46 and the camera 50 may function as the sensing unit that senses the eye blink.

In addition, the action recognition module 40a may receive an output signal of the microphone 30 and an output signal of the camera 50, control some mouse operations by using the received signals, and control the remaining mouse operations based on the gyro sensor or the acceleration sensor embedded therein.

For example, the action recognition module 40a may generate x-axis and y-axis cursor movements of the three-dimensional mouse device by sensing vertical and horizontal movements of a head of a user (see 2 of FIG. 5), based on a 3-axis gyro sensor or acceleration sensor embedded therein, may determine a wheel velocity according to an acceleration magnitude of the vertical movement of the head, may execute move-backward when the acceleration of the left movement of the head is greater than a preset acceleration, and may execute move-forward when the acceleration of the right movement of the head is greater than the preset acceleration.

The action recognition module 40a may execute left-click when a muscle movement caused by a blink of a user's left eye is sensed through an image sensor (camera), may execute double-click (double-click of a left button or a right button) when a muscle movement caused by twice blink of a user's left eye within a preset unit time, and may execute right-click when a muscle movement caused by a blink of a user's right eye is sensed.

Figure 8:
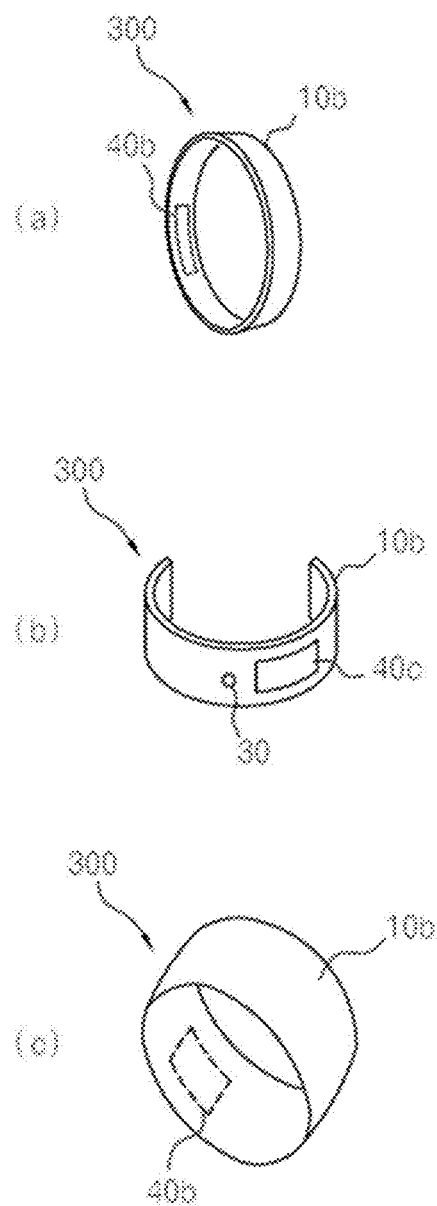
FIG. 8 is a diagram of a three-dimensional mouse according another embodiment of the present invention.

FIG. 8 is a diagram of a three-dimensional mouse device according another embodiment of the present invention.

Referring to FIG. 8, the three-dimensional mouse device 300 according to the present embodiment may be mounted on the support member 10b that has a shape of a wrist bracelet or an ankle bracelet or a shape of a wrist band or an ankle band, which can be worn on a wrist or an ankle.

The support member 10b may have a shape of a hard ring-type band as illustrated in FIG. 8A, a shape of a hard bracket-type band as illustrated in FIG. 8B, and a shape of a flexible ring-type band as illustrated in FIG. 8C, but is not limited thereto.

The three-dimensional mouse device 300 may include the support member 10b and the action recognition module 40b. In addition, the three-dimensional mouse device 300 may further include a microphone 30. In this case, the action recognition module may be implemented to store a voice signal input through the microphone 30, compare the voice signal input through the microphone 30 with a voice command, and perform a preset mouse function.

Figure 9:
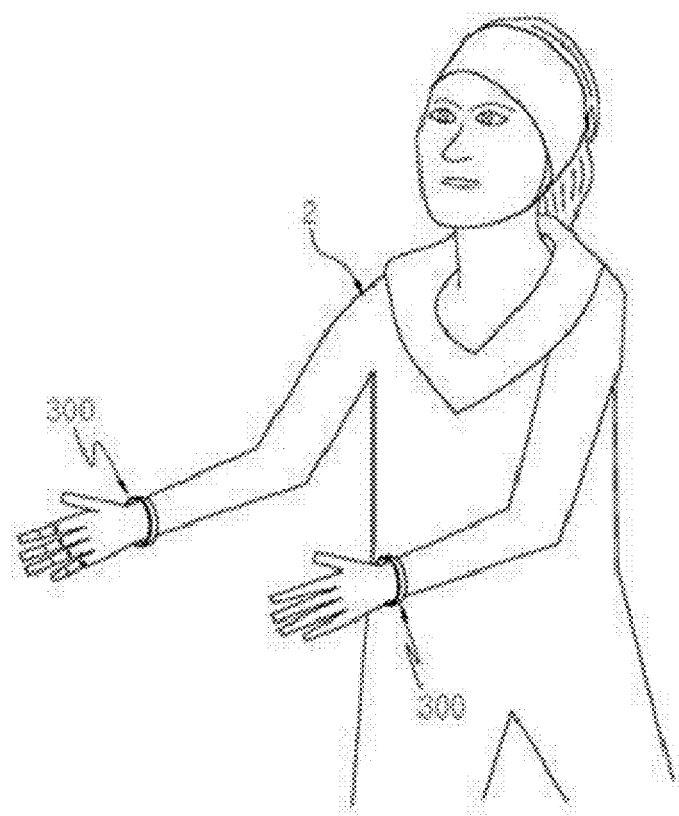
FIG. 9 is a diagram for describing an operation principle of the three-dimensional mouse of FIG. 8.

FIG. 9 is a diagram for describing the operation principle of the three-dimensional mouse device of FIG. 8.

Referring to FIG. 9, the three-dimensional mouse device 300 according to the present embodiment may includes a first support member (see 10b of FIG. 8) and a second support member which have a shape of a ring-type band wearable on the wrist. The action recognition module embedded in the first support member and the action recognition module embedded in the second support member are substantially identical to each other and may share the function of the three-dimensional mouse device 300 according to implementations.

For example, the action recognition module of the first support member may generate x-axis and y-axis cursor movements by sensing vertical and horizontal movements of one wrist, based on a 3-axis gyro sensor or acceleration sensor embedded in the first support member, may determine a wheel velocity according to an acceleration magnitude of the vertical movement of one wrist, may execute move-backward when the acceleration of the left movement of one wrist is greater than a preset acceleration, and may execute move-forward when the acceleration of the right movement of one wrist is greater than the preset acceleration.

The action recognition module of the second support member may execute left-click when an upward-movement acceleration of the other wrist is equal to or greater than a preset acceleration or when the upward wrist flick is sensed once, based on a 3-axis gyro sensor or acceleration sensor embedded in the second support member, may execute a preset double-click when an upward-movement acceleration and a downward-movement acceleration of the other wrist are equal to or greater than a preset acceleration, and may execute right-click when a left-movement or right-movement acceleration of the other wrist is equal to or greater than a preset acceleration or when a leftward or rightward wrist flick is sensed.

Figure 10:
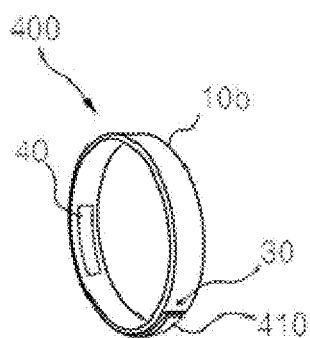
FIG. 10 is a perspective view of a three-dimensional mouse according another embodiment of the present invention.
Figure 11:
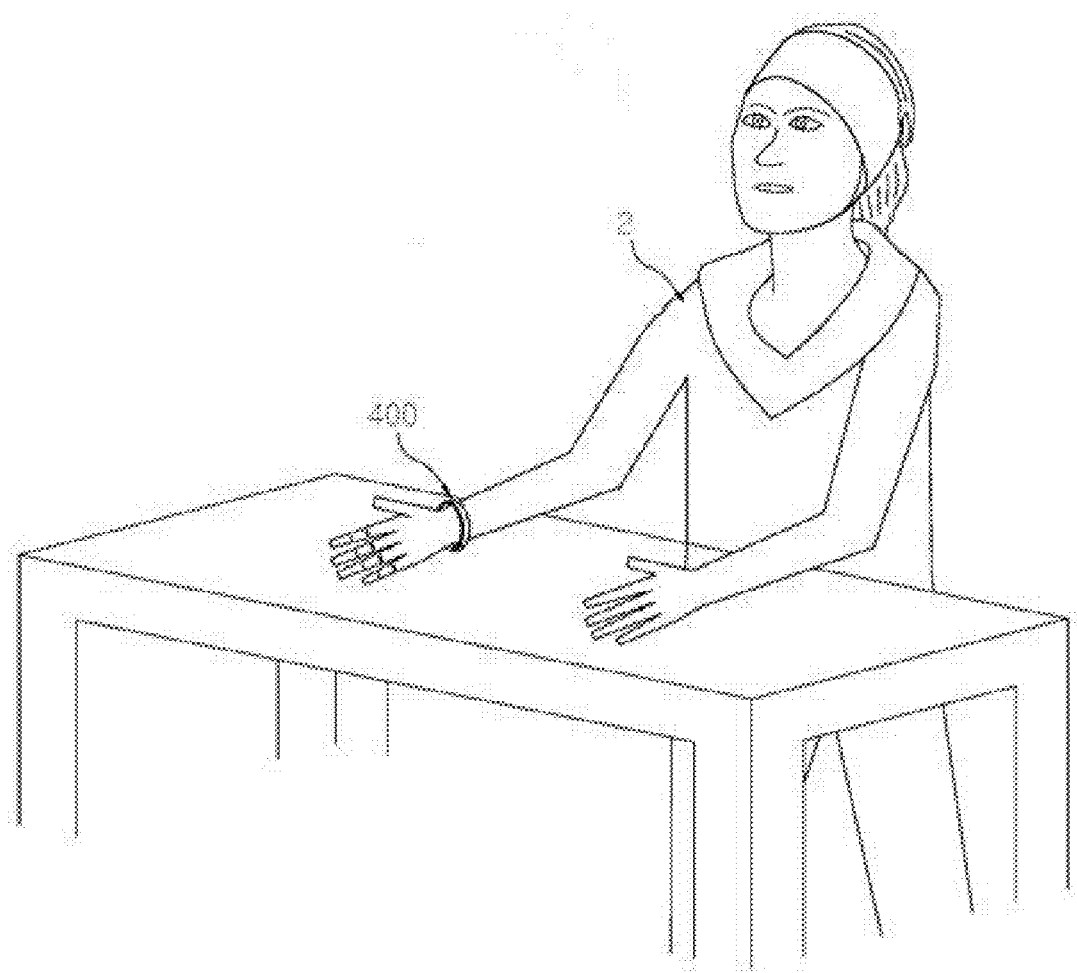
FIG. 11 is a diagram for describing an operation principle of the three-dimensional mouse of FIG. 10.

FIG. 10 is a perspective view of a three-dimensional mouse device according another embodiment of the present invention. FIG. 11 is a diagram for describing the operation principle of the three-dimensional mouse device of FIG. 10.

Referring to FIG. 10, the three-dimensional mouse device 300 according to the present embodiment includes a ring-type band-shaped support member 10b wearable on a wrist, a microphone 30 and an action recognition module 40 mounted on the support member 10b, and a button module 410. The button module 410 may include a wheel button, a left button (left button sensor), and a right button (write button sensor).

The mouse operation function by the microphone 30 may be selectively enabled or disabled.

Referring to FIG. 11, in the three-dimensional mouse device according to the present embodiment, the action recognition module (see 40 of FIG. 10) may generate x-axis and y-axis cursor movements by sensing vertical and horizontal movements of a wrist of a user 2, based on a 3-axis gyro sensor or acceleration sensor embedded in the support member 10b, may execute a wheel function according to a direction in which the wheel button is moving while contacting a surface of an object, may execute move-backward when the acceleration of the left movement of the wrist is greater than a preset acceleration, and may execute move-forward when the acceleration of the right movement of the wrist is greater than the preset acceleration.

In addition, the action recognition module may execute left-click when the center of gravity is moved leftward in such a state that the left button of the button module (see 410 of FIG. 10) is pressed on the surface of the object, may execute a preset double-click when the center of gravity is moved leftward twice within a preset time in such a state that the left button is pressed on the surface of the object, and may execute right-click when the center of gravity is moved rightward in such a state that the right button is pressed on the surface of the object.

On the other hand, as described above, the support member of the three-dimensional mouse device according to another embodiment of the present invention may be used as ring- or band-shaped first and second support members wearable on the ankle, similarly to the first and second support members wearable on the wrist as illustrated in FIG. 9.

In this case, the action recognition module may generate x-axis and y-axis cursor movements by sensing vertical and horizontal movements of one ankle, based on a 3-axis gyro sensor or acceleration sensor embedded in the first support member, may determine a wheel velocity according to an acceleration magnitude of the vertical or horizontal movement of one ankle, may execute move-backward when the acceleration of the left movement of one ankle is greater than a preset acceleration, and may execute move-forward when the acceleration of the right movement of one ankle is greater than the preset acceleration.

The action recognition module may execute left-click when an upward movement of one ankle or an upward movement of a heel is sensed, based on a 3-axis gyro sensor or acceleration sensor embedded in the second support member, may execute double-click when an upward-movement acceleration of the other ankle is sensed twice within a preset time, and may execute right-click when a downward movement of the other ankle or an upward movement of a ball of a foot is sensed.

On the other hand, as described above, the three-dimensional mouse device according to another embodiment of the present invention may further include a button module to be mounted on socks connected to a ring- or band-shaped support member wearable on the ankle, similarly to the three-dimensional mouse device of FIGS. 10 and 11. The button module may include a wheel button, a left button sensor, and a right button sensor.

In this case, the action recognition module may generate x-axis and y-axis cursor movements by sensing vertical and horizontal movements of the ankle, based on a 3-axis gyro sensor or acceleration sensor embedded in the support member, may execute a wheel function a direction in which the wheel button is moving while contacting the surface of the object, may execute move-backward when the acceleration of the left movement of the ankle is greater than a preset acceleration, and may execute move-forward when the acceleration of the right movement of the ankle is greater than the preset acceleration.

In addition, the action recognition module may execute left-click when a downward curl of toes is sensed through the left button sensor (see 410 of FIG. 10), may execute double-click when a downward curl of toes is sensed twice or more within a preset time by the left button sensor, and may execute right-clock when an upward movement of toes is sensed through the right button sensor.

Hereinafter, an embodiment of a marionette control system for controlling an operation of a marionette by using the above-described three-dimensional mouse technology will be described.

Figure 12:
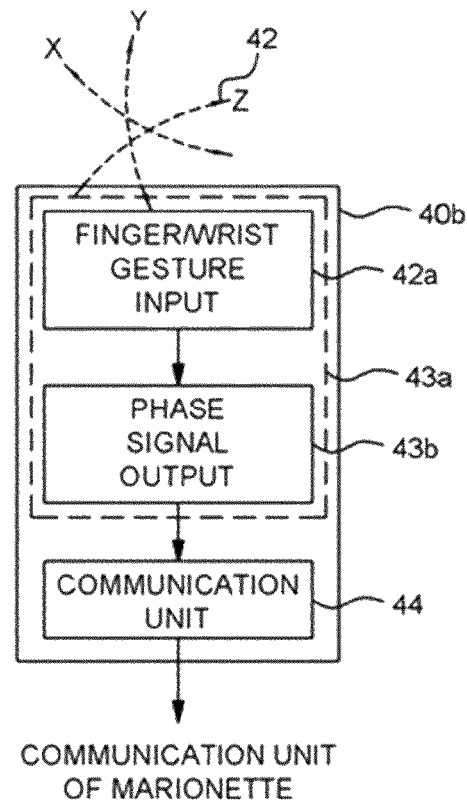
FIG. 12 is a schematic block diagram of a marionette control system according to another embodiment of the present invention.
Figure 13:
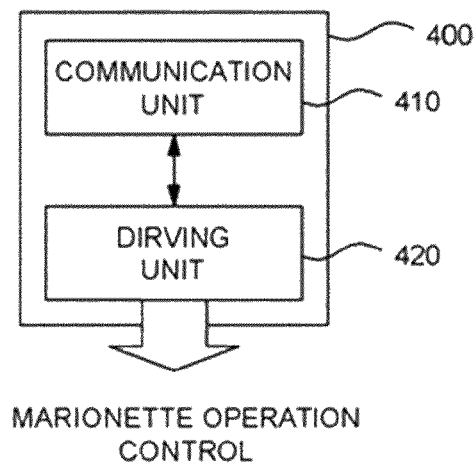
FIG. 13 is a schematic block diagram of a controller mounted on a marionette to transmit and receive communication data with the marionette control system of FIG. 12.

FIG. 12 is a schematic block diagram of a marionette control system according to another embodiment of the present invention. FIG. 13 is a schematic block diagram of a controller mounted on a marionette to transmit and receive communication data with the marionette control system of FIG. 12.

Referring to FIG. 12, the marionette control system 40b according to the present embodiment may include a sensing unit 42a that recognizes a gesture input of one or more of a finger and a wrist, a conversion unit 43b that converts the gesture input of the sensing unit 42a into a phase signal, and a communication unit 44 that transmits the phase signal output from the conversion unit 43b to a communication unit of the marionette over a communication signal. The sensing unit 42a and the conversion unit 43b may be implemented as a unit for performing the corresponding function in one or more MCUs or the control unit 43a, or may be implemented as an element for performing the function corresponding to the unit.

The sensing unit 42a may include a 6-axis motion sensor. The sensing unit 42a and the conversion unit 43b that converts the gesture input of the sensing unit 42a into the phase signal will be described below in detail.

Next, referring to FIG. 13, a marionette controller 400 according to the present embodiment may include a communication unit 410 and a driving unit 420. The communication unit 410 transmits and receives a data signal with the communication unit 44 of the marionette control system 40b. The driving unit 420 is connected to the communication unit 410 and is operated in response to a signal received from the communication unit 410.

The driving unit 420 may include a driving motor disposed at a joint or the like of the marionette. The marionette driving motor may include five AX-12A motors manufactured by Robotics and three MX-28 motors that are relatively strong. The AX-12A motors may be used to control both arms, both legs, and a head of the marionette, and the MX-28 motors may be used to move a position of the marionette with three degrees of freedom.

For example, the marionette controller 400 may be implemented using OpenCM9.04 with STM32F103CB that is Cortex-M3 based on Advanced RISC Machine (ARM). The communication unit 410 may use Bluetooth BT-110A manufactured by Robotics. The BT-110A is a slave mode Bluetooth 2.0 and has a valid communication distance of 10 M and a communication rate of 57,600 bps.

The marionette control system 40b described above is a device for controlling the marionette and may include five ring-shaped controllers and one bracelet-shaped controller. The ring-shaped controllers may be worn on the first knuckles of the fingers and be operated to recognize the finger gestures. The reason why the ring-shaped controllers are worn on the first knuckles of the fingers is that the first knuckle of the finger is larger in movement than the second or third knuckle and if the movement is large, it is easy to recognize the motion. The bracelet-shaped controller may be worn on the wrist and be operated to recognize the wrist gesture.

In the sensor that recognizes the wrist and finger motions, both of the bracelet and the ring may be implemented using 6-axis motion sensors. The 6-axis motion sensor may be implemented using an MPU-6050 sensor manufactured by the InvenSense company. The MPU-6050 sensor may measure a 3-axis acceleration value and a 3-axis gyro value and randomly select an acceleration range and a gyro range in use. In the present embodiment, the acceleration range is ±2 g and the gyro range is ±250°/sec, but the present invention is not limited thereto.

Figure 14:
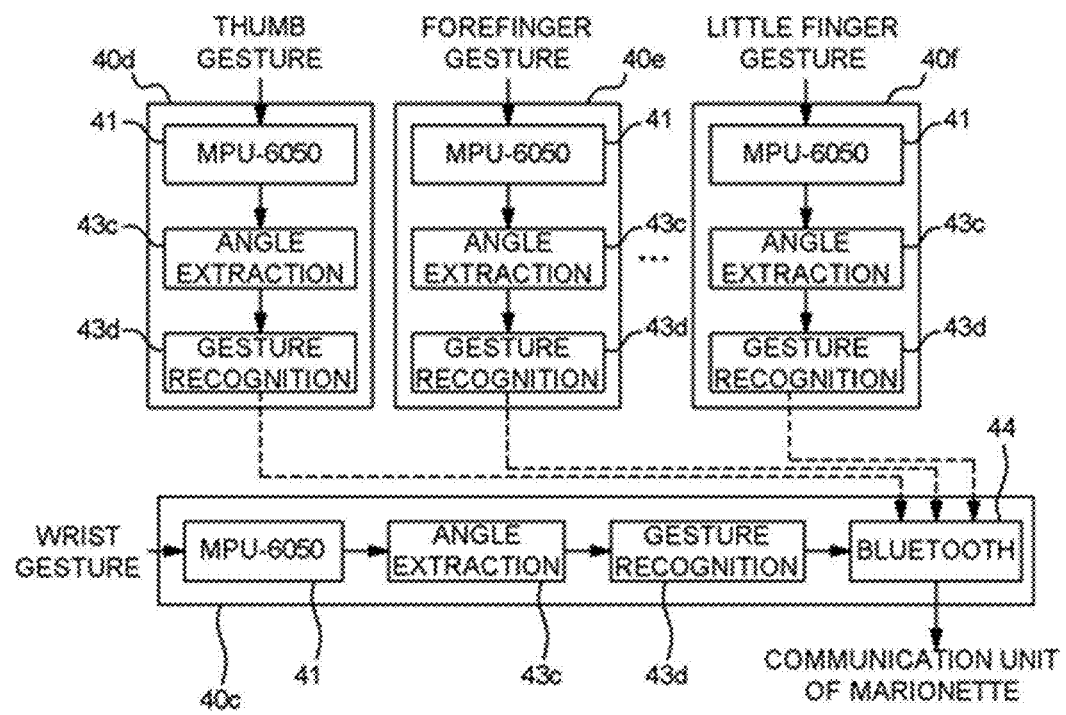
FIG. 14 is a diagram illustrating a signal flow of controllers and gesture sensors that can be employed in the marionette control system of FIG. 13.

FIG. 14 is diagram illustrating a signal flow of the controllers and the gesture sensors that can be employed in the marionette control system of FIG. 13.

As illustrated in FIG. 14, two types of control units or controller are used in the marionette control system 40b. For example, a first controller, which is mounted on the controller (40d, 40e, or 40f) including the ring-shaped support portion or the case, may be implemented using an ultra-small Arduino Beetle (20×18×2 mm) on which AVR-based ATmega32u4 is mounted. A second controller, which is mounted on the controller 40c including a bracelet-shaped support portion or a case, may be implemented using Arduino pro mini 3.3V on which AVR-based ATmega328 is mounted. The bracelet-shaped controller 40c may use Bluetooth FB155BC for communication and may perform data communication with BT-110A that is Bluetooth slave.

According to the above-described configuration, during hand control by the controllers disposed on the wrist and the fingers of the user, as illustrated in FIG. 14, the Arduino controller (marionette control system) may recognize the finger/wrist gesture, generate a phase signal by converting the recognized gesture input, and transfer the generated phase signal to a motor connected to the controller of the marionette through Bluetooth. In this manner, the operation of the marionette can be controlled by winding or unwinding a string connected to the motor.

Referring again to FIG. 14, the operation of controlling the gesture of the marionette by the marionette control system will be described below.

Values set to the motor of the marionette are shown in Table 1 below.

TABLE 1

| Motor Type | Control Range (Control Angle) | Control Object | Velocity (rpm) |
|---|---|---|---|
| AX-12A | 12-182 | Head | 11.1 |
|  | 307-752 | Left arm | 33.33 |
|  | 357-792 | Right arm |  |
|  | 312-702 | Left foot |  |
|  | 312-632 | Right foot |  |
| MX-28 | 1973-2673 | Large circle | 5.7 |
|  | 1418-2198 | Small circle |  |
|  | 1950-2683 | Jump | 57 |

As shown in Table 1 above, the AX-12A motors control a head, a left arm, a right arm, a left foot, and a right foot. Control angles are set to the respective motors so as to prevent the marionette from being moved more than necessary. The MX-28 motor is used for controlling the position of the marionette. If the speed of the motor is fast, the string connected between the motor and the marionette may be twisted. Hence, the speed of the motor is relatively low.

The ring-shaped controllers 40d, 40e, and 40f may be prepared such that the controllers 40d, 40e, and 40f are installed in the thumb to the little finger one by one, and each of the controllers 40d, 40e, and 40f may serve as a small controller. Each finger gesture recognition may be implemented to include an operation of determining the finger gesture recognition (43d) after extracting the rotating angle (43c) according to the position of the finger through the MPU-6050 sensor 41.

For example, the ring-shaped controllers 40d, 40e, and 40f may recognize only one degree of freedom and recognize whether the finger is bent or spread out. In the present embodiment, when the finger is bent maximally roundly, the ring-shaped controller may recognize that the finger is bent, and when the finger is spread out linearly with the back of the hand, the ring-shaped controller may recognize that the finger is spread out.

The bracelet-shaped controller 40c may extract the angle (43c) according to the position of the wrist through the MPU-6050 sensor 41, determine the position of the wrist through the extracted angle, and recognize the wrist gesture from the determined position of the wrist (43d).

Since the ring-shaped controllers 40d, 40e, and 40f control one motor, it is sufficient even if one degree of freedom is present. However, since the bracelet-shaped controller 40c controls three motors that control the position of the marionette, two degrees of freedom are needed. Therefore, the bracelet-shaped controller can recognize six gestures. For example, it is possible to recognize a gesture of moving the wrist up and down, a gesture of twisting the wrist left and right, and a gesture of twisting the wrist from below to right and left.

According to the present embodiment, the ring-shaped controllers 40d, 40e, and 40f perform recognize the gesture of the finger movement through the MPU-6050 sensor, and transmit data regarding the recognized gesture to the bracelet-shaped controller 40c, and the bracelet-shaped controller 40c transmits the control command to the controller of the marionette through Bluetooth communication. In this manner, the operation of the marionette can be controlled. The data transmission from the ring to the bracelet may be performed by serial communication, more specifically 5:1 communication, but is not limited thereto.

Figure 15:
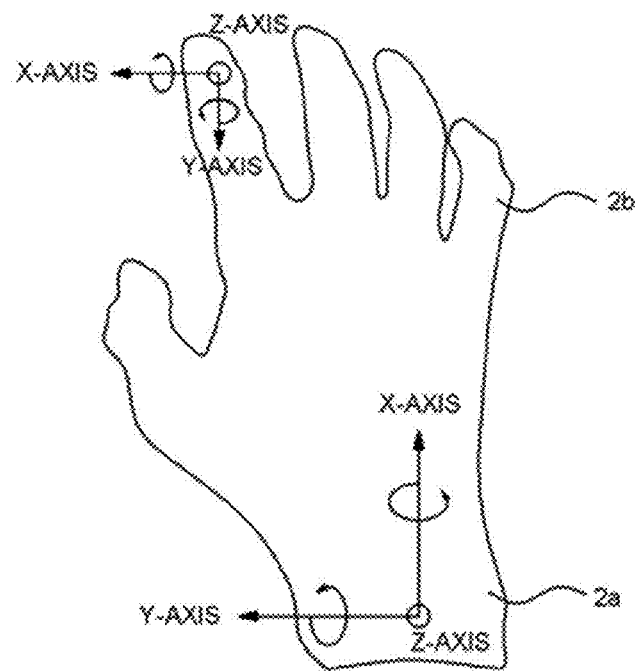
FIG. 15 is an exemplary diagram illustrating a coordinate system of a ring/bracelet 6-axis motion sensor employed in the marionette control system of FIG. 14.

FIG. 15 is an exemplary diagram illustrating a coordinate system of the ring/bracelet 6-axis motion sensor employed in the marionette control system of FIG. 14.

Referring to FIG. 15, the movement of each finger 2b on X-axis, Y-axis, and Z-axis and the movement of the wrist 2a on X-axis, Y-axis, and Z-axis can be recognized through the 6-axis motion sensor, and the marionette can be effectively controlled through a combination thereof.

When comparing five fingers with the body of the human, it is preferable in terms of ease of implementation the forefinger and the thumb correspond to the left of the body of the human with reference to the middle finger positioned in the middle of the hand, and the ring finger and the little finger correspond to the right of the body of the human. That is, the thumb, the forefinger, the middle finger, the ring finger, and the little finger may be set to correspond to the left foot, the left hand, the head, the right hand, and the right foot, respectively.

On the other hand, among the five fingers, the ring finger has the lowest degree of freedom, and the middle finger has the highest degree of freedom. The head corresponding to the head does not require many degrees of freedom, but the right hand corresponding to the ring finger requires many degrees of freedom. For this reason, the roles of the middle finger and the ring finger are exchanged in the present embodiment.

Table 2 below shows the ring-shaped controllers and the control parts of the marionette and describes the movements of the control parts according to the respective gestures.

TABLE 2

| Marionette | Ring Sensor | Gesture | Motion |
|---|---|---|---|
| Head | Ring Finger | Spread out | Move up |
| | | Bent | Move down |
| Left Hand | Forefinger | Spread out | Move up |
| | | Bent | Move down |
| Right Hand | Middle Finger | Spread out | Move up |
| | | Bent | Move down |
| Left Foot | Thumb | Spread out | Move up |
| | | Bent | Move down |
| Right Foot | Little Finger | Spread out | Move up |
| | | Bent | Move down |

Table 3 below describes the position movements of the marionette according to the control parts of the bracelet-shaped controller.

TABLE 3

| Marionette Position Control | Bracelet-shaped Controller | Gesture | Motion |
|---|---|---|---|
| Large Circular Rotation | Twist of Wrist | Right | Large Rightward Movement |
| | | Left | Small Leftward Movement |
| Small Circular Rotation | Downward Twist of Wrist | Right | Small Rightward Movement |
| | | Left | Small Leftward Movement |
| Jump | Upward Movement of Wrist | Left | Jump |

In the control of the marionette, there is no problem in the wrist gesture recognition, but a problem may occur in the finger gesture recognition. That is, the individual finger gesture recognition has excellent recognition rates, but the gesture recognition rate may be greatly reduced when three or more fingers are simultaneously controlled. The reduction in the recognition rate is not because data cannot be simultaneously exchanged but because the degree of freedom is more lowered when the fingers are simultaneously moved than when the fingers are individually moved. In addition, due to the structural problem of the hand, there is a limitation in expression if the user does not sufficiently exercise and train.

Figure 16:
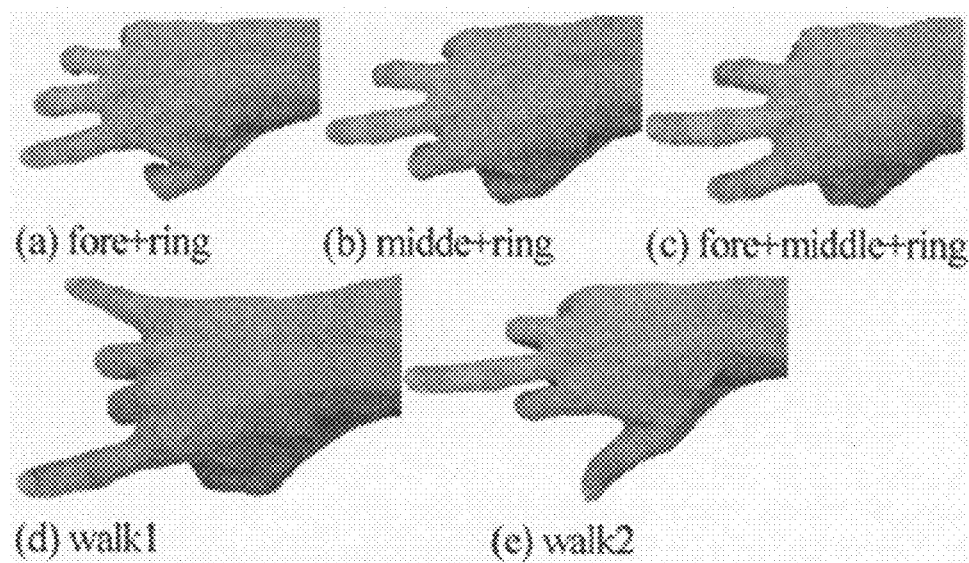
FIG. 16 is an exemplary diagram illustrating actions that are difficult to express with a finger gesture in the marionette control system according to the present embodiment.

FIG. 16 is an exemplary diagram illustrating actions that are difficult to express with the finger gesture in the marionette control system according to the present embodiment.

As illustrated in FIG. 16, FIG. 16A illustrates an action in which only the forefinger and the ring finger are spread out. In this case, the marionette raises the left hand and the head. FIG. 16B illustrates an action in which only the middle finger and the ring finger are spread out. In this case, the marionette raises the right hand and the head. FIG. 16C illustrates an action in which the fingers, that is, the forefinger, the middle finger, and the ring finger, are spread out. In this case, the marionette raises both hands and the head. In controlling such motions, the gesture may not be recognized when the fingers are not completely spread out, and thus, the marionette may not be controlled as desired.

In addition, FIGS. 16D and 16E illustrate actions in which the marionette takes a walk motion. That is, when the forefinger and the little finger are spread out and the middle finger and the thumb are bent, as illustrated in FIG. 16D, the marionette may raise the left hand and the right foot and lower the right hand and the left foot. In addition, when the middle finger and the thumb are spread out and the forefinger and the little finger are bent, as illustrated in FIG. 16E, the marionette may raise the right hand and the left foot and lower the left hand and the right foot. However, in order for the marionette to take the walk motion, the actions of FIGS. 16D and 16E need to be repeated. Whenever one action is performed, the four fingers need to be alternately moved. Thus, the gesture rate may be reduced.

Therefore, in the present embodiment, the above-described gesture modes (see FIG. 16) may be changed as described below. Table 4 below shows the control modes changed according to the gesture modes. The gesture modes are a total of six modes (excluding a neck gesture and a jump gesture) and the marionette may be controlled by selecting the gesture mode as necessary.

TABLE 4

| Finger | Thumb | Forefinger | Middle Finger |
|---|---|---|---|
| GM1 Control Dedicated to Upper Body | Head | Left Hand | Right Hand |
| GM2 Control Dedicated to Lower Body | Head | Left Foot | Right Foot |
| GM3 Control Dedicated to Left Side | Head | Left Hand | Left Foot |
| GM4 Control Dedicated to Right Side | Head | Right Hand | Right Foot |
| GM5 Crossing Control Walking | Head | Left Hand + Right Foot | Right Hand + Left Foot |
| GM6 Control for Each Finger | | See Table 2 | |

In Table 4 above, a marionette control method of gesture mode 1 (GM1) may be used when intending to fix the lower body and control only the upper body. In the GM1, a signal for controlling the lower body is interrupted so that only the upper body is moved. That is, the forefinger and the middle finger may be implemented to control the left hand and the right hand as in the individual control, and the thumb having better degree of freedom than the ring finger may be implemented to control the head. In the GM1, the ring finger and the little finger may not be used.

In addition, a marionette control method of GM2 may be used when intending to fix the upper body and control only the lower body. In the GM2, the forefinger and the middle finger may be implemented to control the left foot and the right foot.

In addition, a marionette control method of GM3 may be used when intending to fix the right side and control only the left side. In the GM3, the forefinger and the middle finger may be implemented to control the left hand and the left foot.

In addition, a marionette control method of GM4 may be used when intending to fix the left side and control only the right side. In the GM4, the forefinger and the middle finger may be implemented to control the right hand and the right foot.

In addition, contrary to the above-described gesture modes used when intending to fix a certain part and control only another part, a marionette control method of GM5 may be used when intending to control only a motion of a specific part, without fixing the marionette. The use of the GM5 may control the walk motion of the marionette. In this case, the GM5 may be used when simultaneously controlling the left hand and the right foot and simultaneously controlling the right hand and the left foot.

A marionette control method of GM6 may include the control of fingers as an individual control mode.

According to the present embodiment, it is possible to provide the system that controls the marionette by sensing the wrist gesture and the finger gesture and transferring the command to the motor connected to the marionette by wireless. When such a system is used, the degree-of-freedom actions, such as movements of the arms, foots, and neck of the marionette, plane movement, and jump, can be controlled as the remote wrist and finger gestures. The gesture modes may include eight degree-of-freedom actions: four arm/foot gestures, a neck gesture, a plane movement gesture, and a jump gesture.

In addition, complicated postures can be successfully controlled through a gesture conversion technique. In particular, the first controller or the second controller that receives the gesture signal from the first controller may perform gesture conversion so as to cope with deficient degree of freedom (twist, etc.) of the finger due to the interworking of the fingers when the finger gesture is generated. The gesture conversion may include converting the gesture mode such that the body part of the marionette corresponding to the forefinger or the middle finger of any one selected among a plurality of control modes (including the finger gesture) according to the gesture mode becomes other body part of the marionette corresponding to the forefinger or the middle finger of other control mode among the plurality of control modes, so as to prevent the twist of the fingers for the purpose of a specific action of the marionette during the control of the marionette. The conversion of the gesture mode may correspond to the setting (resetting) of the gesture mode that is dynamically performed during the control of the marionette.

According to the present invention, it is possible to effectively perform a mouse operation through a three-dimensional mouse device using body parts, except for fingers, in various work environments or various physical handicap conditions.

In addition, according to the present invention, user convenience can be significantly improved by executing the three-dimensional mouse device using a motion of a body part with respect to a head, eyes, wrists, ankles, or a combination thereof.

In addition, according to the present invention, it is possible to provide a three-dimensional mouse device that can effectively perform three-dimensional mouse operations using a wrist gesture and a finger gesture. In particular, it is possible to provide a three-dimensional mouse device that can solve a problem that cannot implement a finger twist motion when fingers are used in an existing method.

Furthermore, according to the present invention, it is possible to provide a marionette control system that can effectively perform remote control on a specific device or a marionette three-dimensionally by wireless by using a wrist gesture and a finger gesture. In particular, when implementing an action difficult to express with fingers due to a finger twist, the fingers of a control mode can be changed and used according to a gesture mode, thereby maximizing control convenience.

While the present invention has been described with reference to the exemplary drawings, it will be apparent to those skilled in the art that various changes and modifications may be made without departing from the spirit and scope of the invention as defined in the following claims. Therefore, it should be understood that the above-described embodiments are exemplary and are not restrictive in all aspects.

What is claimed is:

1. A marionette control system comprising:
a second controller that includes a sensing unit, a conversion unit, and a communication unit, the second conversion unit being installed on a wrist of a user to sense a preset gesture of the wrist; and
a first controller that includes a sensing unit and a conversion unit, the first controller being installed in a finger of the user to sense a preset gesture of the finger,
wherein the first controller provides the gesture input of the finger to the second controller, and
the second controller transmits an action control signal corresponding to the gesture input of the finger and the gesture input of the wrist to a controller of the marionette through the communication unit, and
the first controller or the second controller performs gesture conversion so as to cope with deficient degree of freedom of the finger, including a twist, due to the interworking of the fingers when the finger gesture is generated.

2. The marionette control system of claim 1, wherein the first controller includes a plurality of controllers that are installed on a plurality of fingers of the user, respectively.

3. The marionette control system of claim 2, wherein a control relation between the fingers and the marionette in each gesture mode by the plurality of first controller and the second controller includes a plurality of control modes that are divided into a control dedicated to an upper body, a control dedicated to a lower body, a control dedicated to a left side, a control dedicated to a right side, a crossing control, and a control for each finger.

4. The marionette control system of claim 3, wherein the first controller or the second controller converts the gesture such that a body part of the marionette corresponding to a forefinger or a middle finger of any one selected among a plurality of control modes according to the gesture mode becomes other body part of the marionette corresponding to the forefinger or the middle finger of other control mode among the plurality of control modes.

5. The marionette control system of claim 3, wherein
the gesture mode includes eight degree-of-freedom actions: four arm/foot gestures, a neck gesture, a plane movement gesture, and a jump gesture.

* * * * *